US012592510B2

(12) United States Patent
Tsuchiya

(10) Patent No.: US 12,592,510 B2
(45) Date of Patent: Mar. 31, 2026

(54) CONNECTOR HAVING RESILENT PORTION FOR PRESSING TERMINAL FITTING

(71) Applicant: SUMITOMO WIRING SYSTEMS, LTD., Mie (JP)

(72) Inventor: Takahiro Tsuchiya, Mie (JP)

(73) Assignee: SUMITOMO WIRING SYSTEMS, LTD., Mie (JP)

( * ) Notice: Subject to any disclaimer, the term of this patent is extended or adjusted under 35 U.S.C. 154(b) by 511 days.

(21) Appl. No.: 18/074,683

(22) Filed: Dec. 5, 2022

(65) Prior Publication Data

US 2023/0198191 A1 Jun. 22, 2023

(30) Foreign Application Priority Data

Dec. 17, 2021 (JP) ................................. 2021-204715

(51) Int. Cl.

*H01R 13/506* (2006.01)
*H01R 13/422* (2006.01)
*H01R 13/436* (2006.01)
*H01R 24/20* (2011.01)

(52) U.S. Cl.

CPC ....... *H01R 13/506* (2013.01); *H01R 13/4223* (2013.01); *H01R 13/4364* (2013.01); *H01R 24/20* (2013.01)

(58) Field of Classification Search

None

See application file for complete search history.

(56) References Cited

U.S. PATENT DOCUMENTS 6,716,069 B2 * 4/2004 Nakamura ......... H01R 13/4365 439/752
7,959,465 B2 * 6/2011 Saur ......................... H01R 9/16 439/752
2002/0197914 A1 * 12/2002 Mase ................. H01R 13/4362 439/752
2008/0119075 A1 * 5/2008 Suzuki ............... H01R 13/4362 439/153
2022/0294149 A1 * 9/2022 Teramoto ........... H01R 13/4365
2022/0352668 A1 * 11/2022 Sekino ................. H01R 13/631

FOREIGN PATENT DOCUMENTS

JP 2003-022864 A 1/2003
JP 2010-186612 A 8/2010
JP 2010-277763 A 12/2010
JP 2012-129111 A 7/2012

* cited by examiner

*Primary Examiner* — Oscar C Jimenez
(74) *Attorney, Agent, or Firm* — Venjuris, P.C.

(57) ABSTRACT

A connector 10 is provided with a housing 20, a terminal fitting 30 to be accommodated into a cavity 21 of the housing 20, and a front portion 50 to be mounted on a front surface side of the housing 20. The front portion 50 includes a resilient portion 55 for pressing the terminal fitting 30 and sandwiching the terminal fitting 30 between a facing wall surface portion 21B of the cavity 21 and the resilient portion 55.

10 Claims, 10 Drawing Sheets

CONNECTOR HAVING RESILENT PORTION FOR PRESSING TERMINAL FITTING

CROSS-REFERENCE TO RELATED APPLICATIONS

This application is based on and claims priority from Japanese Patent Application No. 2021-204715, filed on Dec. 17, 2021, with the Japan Patent Office, the disclosure of which is incorporated herein in its entirety by reference.

TECHNICAL FIELD

The present disclosure relates to a connector.

BACKGROUND

A connector disclosed in Japanese Patent Laid-open Publication No. 2012-129111 is provided with a terminal fitting, a housing for accommodating the terminal fitting and a retainer to be movably mounted into the housing. The retainer is movable to a temporary locking position where the retainer does not interfere with the terminal fitting and a complete locking position where the retainer retains the terminal fitting. Connectors having a similar configuration are also disclosed in Japanese Patent Laid-open Publication Nos. 2010-277763, 2003-022864 and 2010-186612.

SUMMARY

In a connector as shown in Japanese Patent Laid-open Publication Nos. 2012-129111, 2010-277763, 2003-022864 and 2010-186612, if a housing has no wall for supporting a front end part of a box portion of a terminal fitting, the terminal fitting is inclined and it becomes difficult to connect the terminal fitting to a mating terminal.

Accordingly, the present disclosure provides a technique capable of satisfactorily connecting a terminal fitting to a mating terminal.

The present disclosure is directed to a connector with a housing, a terminal fitting to be accommodated into a cavity of the housing, and a front portion to be mounted on a front surface side of the housing, the front portion including a resilient portion for pressing the terminal fitting and sandwiching the terminal fitting between a facing wall surface portion of the cavity and the resilient portion.

According to the present disclosure, a terminal fitting can be satisfactorily connected to a mating terminal.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
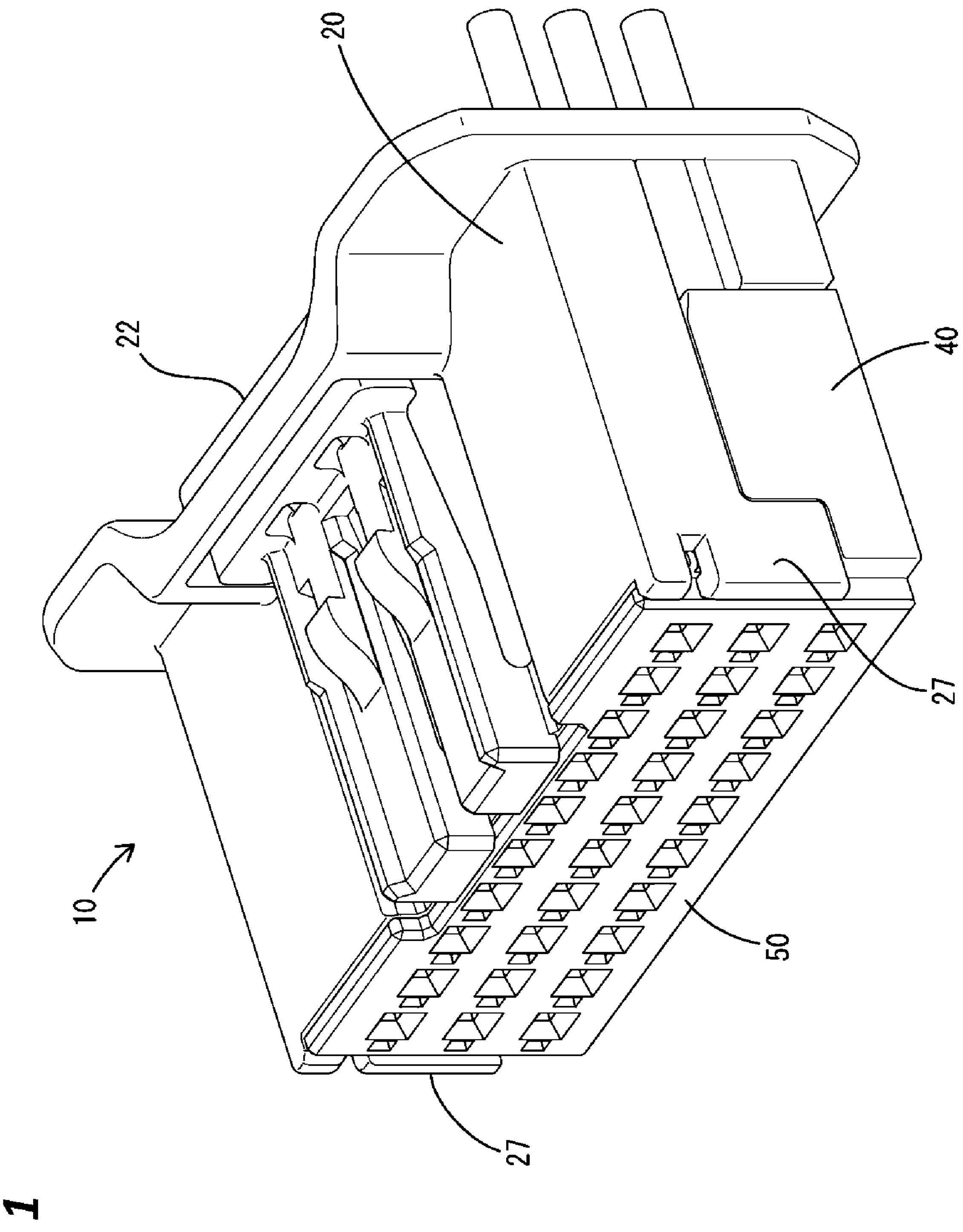
FIG. 1 is a perspective view showing a connector.

In the following detailed description, reference is made to the accompanying drawings, which form a part hereof. The illustrative embodiments described in the detailed description, drawings, and claims are not meant to be limiting. Other embodiments may be utilized, and other changes may be made, without departing from the spirit or scope of the subject matter presented here.

Description of Embodiments of Present Disclosure

First, embodiments of the present disclosure are listed and described.

(1) The connector of the present disclosure is provided with a housing, a terminal fitting to be accommodated into a cavity of the housing, and a front portion to be mounted on a front surface side of the housing, the front portion including a resilient portion for pressing the terminal fitting and sandwiching the terminal fitting between a facing wall surface portion of the cavity and the resilient portion.

According to the configuration of the present disclosure, the terminal fitting can be pressed against the wall surface portion of the cavity by the resilient portion, and an inclined posture (wrenched state) of the terminal fitting can be prevented at the time of connection to a mating terminal.

(2) Preferably, the front portion is movable between a temporary locking position and a complete locking position with respect to the housing, and the resilient portion presses the terminal fitting in a moving direction of the front portion from the temporary locking position to the complete locking position.

According to this configuration, the front portion may be configured to press the resilient portion against the terminal fitting in the moving direction, i.e. configured such that the resilient portion faces the terminal fitting in the moving direction, and a structure can be simplified.

(3) Preferably, a retainer body portion integrally coupled to the front portion is formed behind the front portion, the housing includes a mounting groove, the retainer body portion being arranged in the mounting groove, and the retainer body portion includes an escape restricting portion capable of locking the terminal fitting.

According to this configuration, the number of components can be reduced as compared to the case where the front portion and the retainer body portion are separate bodies.

(4) Preferably, the housing includes a locking lance for restricting the terminal fitting accommodated in the cavity from coming out rearward, the front portion includes a front body portion, and the resilient portion projects rearward from the front body portion in front of the locking lance and is inclined to approach the locking lance toward a rear side and contact the terminal fitting.

According to this configuration, the resilient portion applies a pressing force including a component moving rearward (toward the locking lance) to the terminal fitting. In this way, the terminal fitting is sandwiched in a front-rear direction by the resilient portion and the locking lance, wherefore the rattling of the terminal fitting in the front-rear direction can be restricted.

Details of Embodiment of Present Disclosure

Embodiment

A specific embodiment of a terminal fitting of the present disclosure is described below with reference to FIGS. 1 to 10. In this embodiment, upper and lower sides shown in FIGS. 1 to 10 are directly defined as upper and lower sides concerning a vertical direction. Left and right sides shown in FIGS. 1, 2 and 4 to 6 are respectively defined as front and rear sides concerning a front-rear direction. Sides behind and in front of the planes of FIGS. 1, 2 and 4 to 6 are respectively defined as left and right sides concerning a lateral direction.

(Configuration of Connector)

Figure 2:
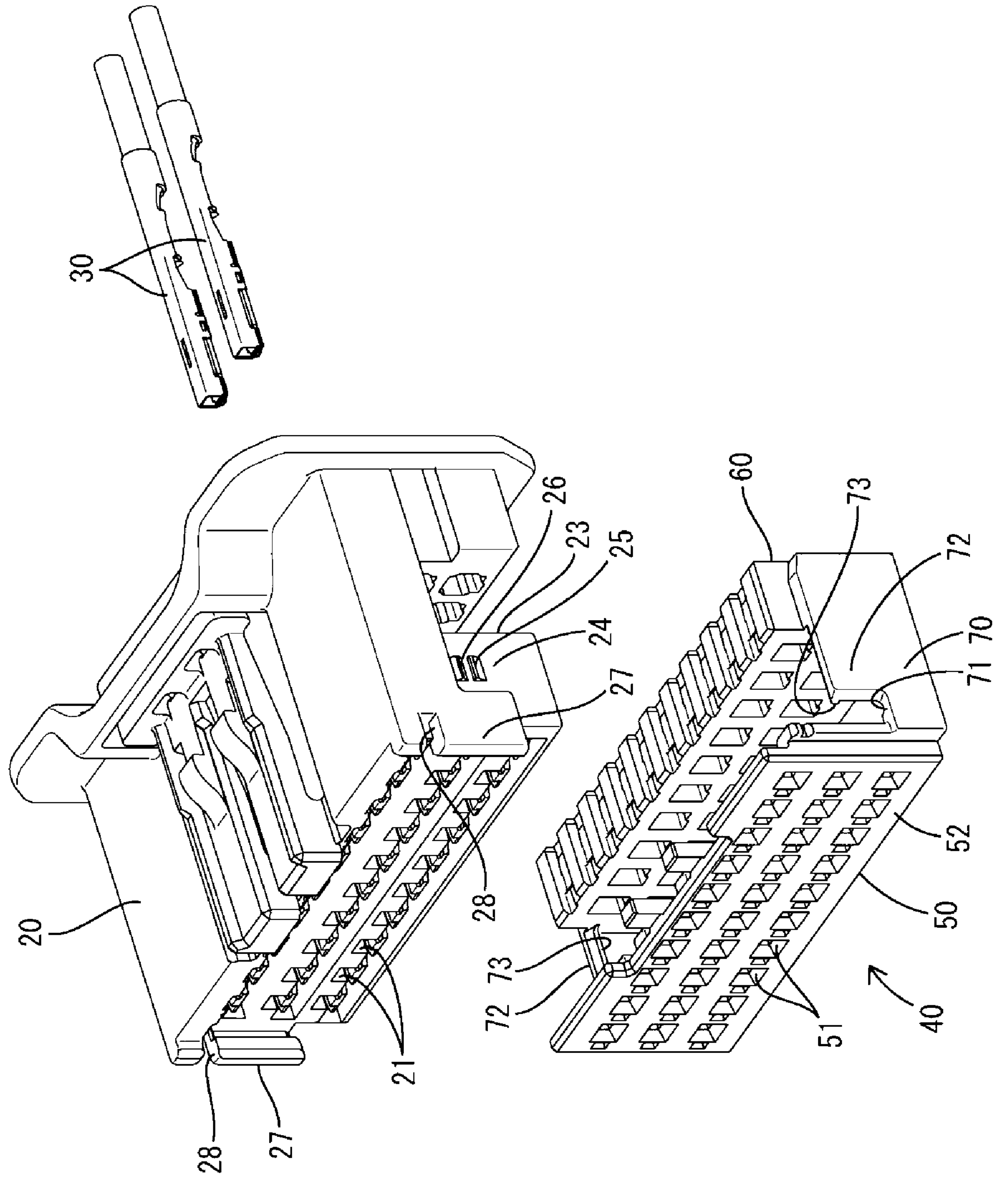
FIG. 2 is an exploded perspective view of the connector.

As shown in FIGS. 1 and 2, a connector 10 of this embodiment is provided with a housing 20, female terminal fittings 30 and a retainer 40. The housing 20 accommodates the terminal fittings 30. The terminal fittings 30 and mating terminal fittings (not shown) are connected by connecting the housing 20 to a mating housing (not shown) of a mating connector (not shown).

(Configuration of Housing)

Figure 4:
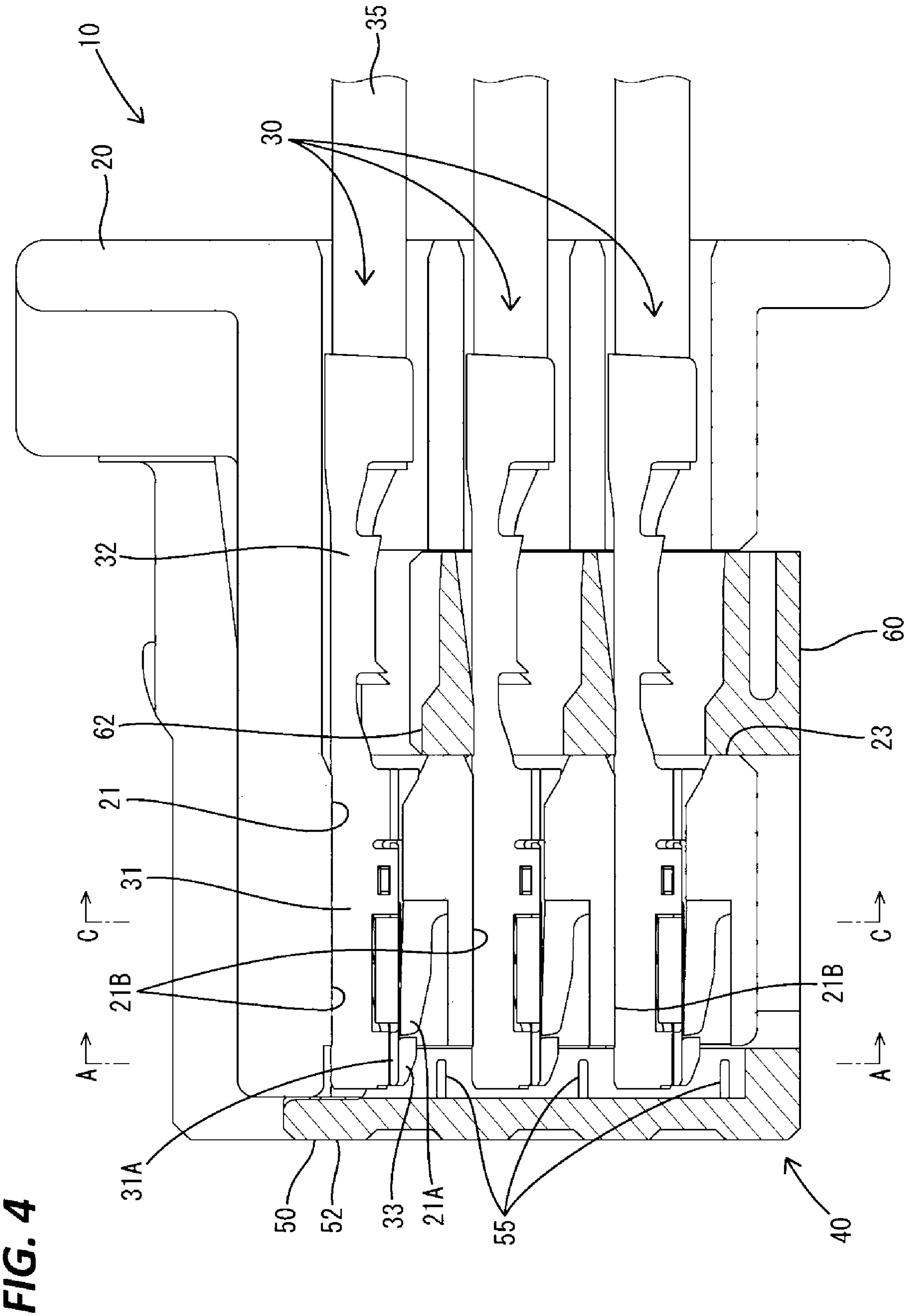
FIG. 4 is a side view in section of the connector when the retainer is at a temporary locking position.

The housing 20 is made of synthetic resin. As shown in FIGS. 2 and 4, the housing 20 includes a plurality of cavities 21 into which the terminal fittings 30 are insertable. A plurality of the cavities 21 are disposed in parallel in the lateral direction separately in three upper and lower stages. The cavity 21 is formed to penetrate through the housing 20 in the front-rear direction. If the housing 20 is connected to the mating housing, tabs of the mating terminal fittings enter the respective cavities 21.

As shown in FIG. 4, the housing 20 is provided with resiliently deformable locking lances 21A projecting into the cavities 21. The locking lance 21A restricts the terminal fitting 30 accommodated in the cavity 21 from coming out rearward.

As shown in FIG. 1, a lock arm 22 is cantilevered rearward on an upper side of the housing 20. The lock arm 22 is deflected and deformed in the vertical direction (height direction).

As shown in FIGS. 2 and 4, the housing 20 includes a mounting groove 23 into which a retainer body portion 60 to be described later is arranged. The mounting groove 23 is open downward near a center in the front-rear direction of the housing 20. The mounting groove 23 is provided to communicate with the respective cavities 21. The mounting groove 23 is also open on both left and right sides of the housing 20.

As shown in FIG. 2, recesses 24 recessed inward in the lateral direction (toward the cavities 21) are provided at positions in front of and adjacent to the mounting groove 23 on the both left and right sides of the housing 20. Although only the recess 24 on the right side appears in FIG. 2, the recess 24 on the left side is similarly configured. The recess 24 is provided with a first locked portion 25 and a second locked portion 26. The first and second locked portions 25, 26 are in the form of claws projecting outward in the lateral direction. The first locked portion 25 is provided on an upper end side of the recess 24. The second locked portion 26 is provided above and away from the first locked portion 25.

Figure 7:
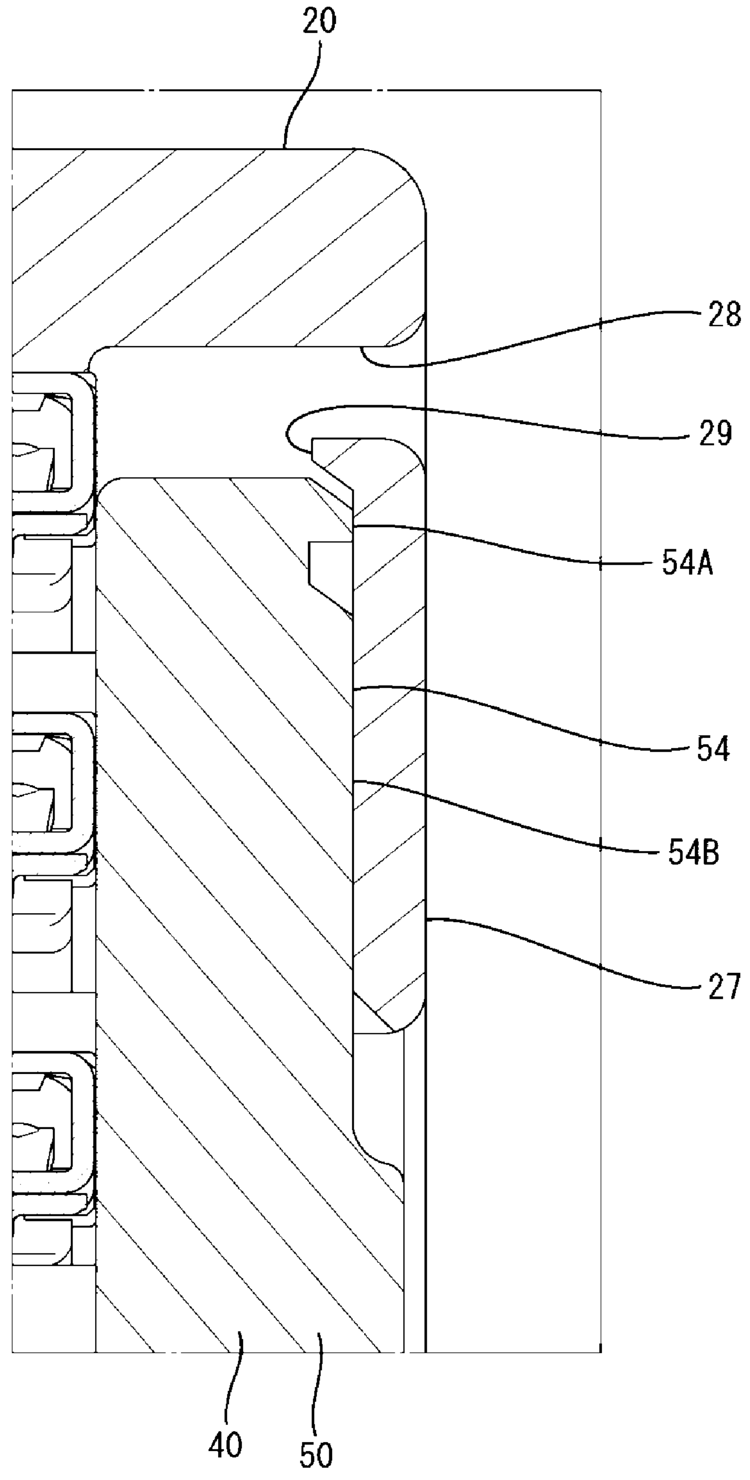
FIG. 7 is a section along A-A of FIG. 4.

As shown in FIG. 2, a side wall 27 projecting forward is provided in front of the first and second locked portions 25, 26 on each of the both left and right sides of the housing 20. An opening 28 recessed rearward is provided on an upper end side of the side wall 27. The opening 28 is also open in the lateral direction. As shown in FIG. 7, a third locked portion 29 projecting inward in the lateral direction (toward the other side wall 27) is provided on a part of a lower wall part of the opening 28.

(Configuration of Terminal Fittings)

Figure 6:
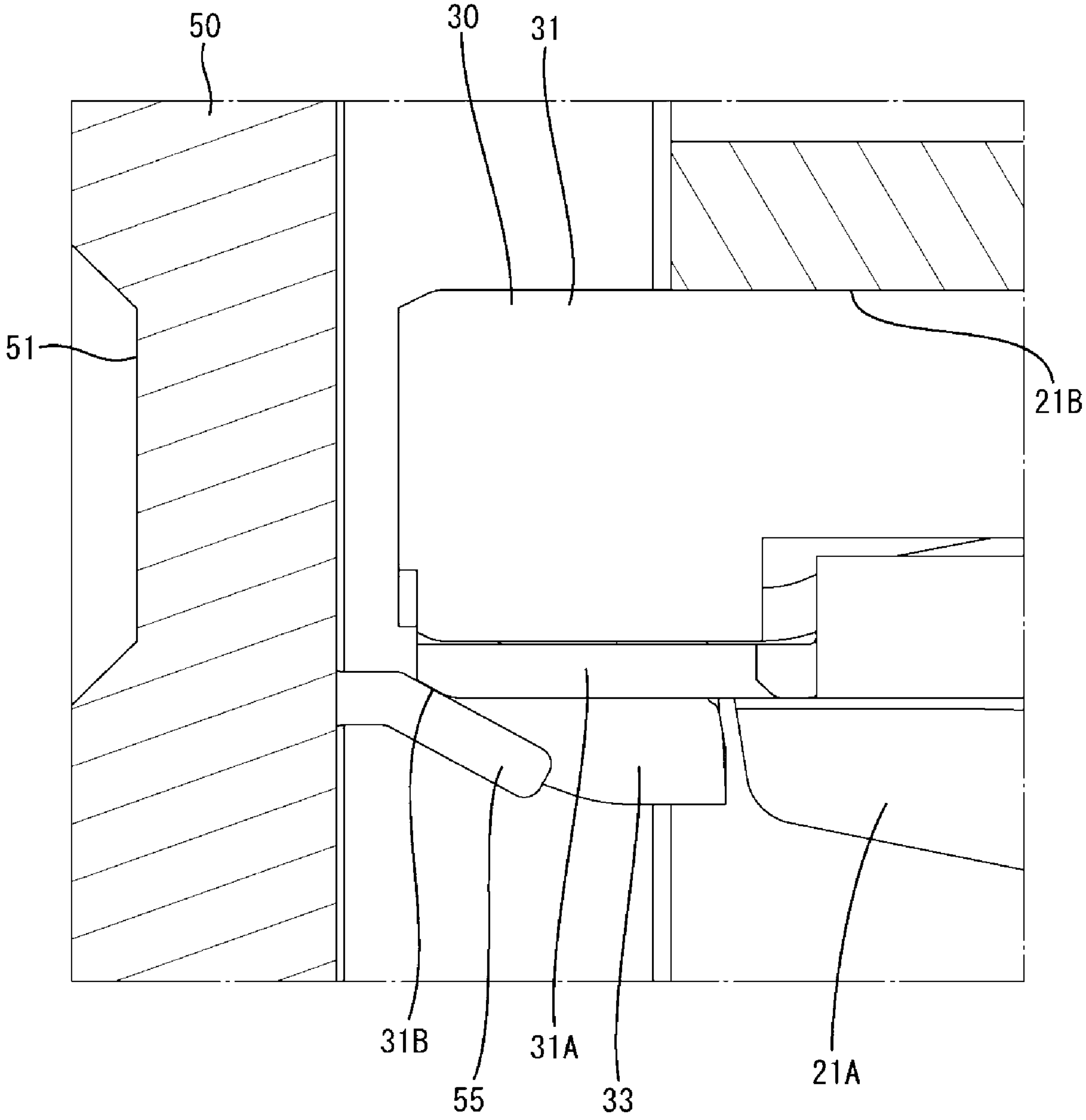
FIG. 6 is an enlarged view of a resilient portion and the periphery thereof in FIG. 5.

As shown in FIG. 4, the terminal fitting 30 has a shape elongated in the front-rear direction as a whole. The terminal fitting 30 includes a box portion 31 and a crimping portion 32. The box portion 31 constitutes a front part of the terminal fitting 30. The box portion 31 is in the form of a rectangular box. A projecting portion 33 projecting downward is provided on the front end of the box portion 31. The projecting portion 33 is formed by deforming a part (lower plate portion 31A) of a lower wall part constituting the box portion 31. The projecting portion 33 is provided in a part of the lower plate portion 31A near a left side. As shown in FIG. 6, a chamfered portion 31B is provided on the front end of the lower plate portion 31A. The chamfered portion 31B is inclined downward toward a rear side. As shown in FIG. 4, the crimping portion 32 is crimped and connected to an end part of a wire 35. The wire 35 is pulled out rearward of the housing 20 from the cavity 21.

(Configuration of Retainer)

Figure 3:
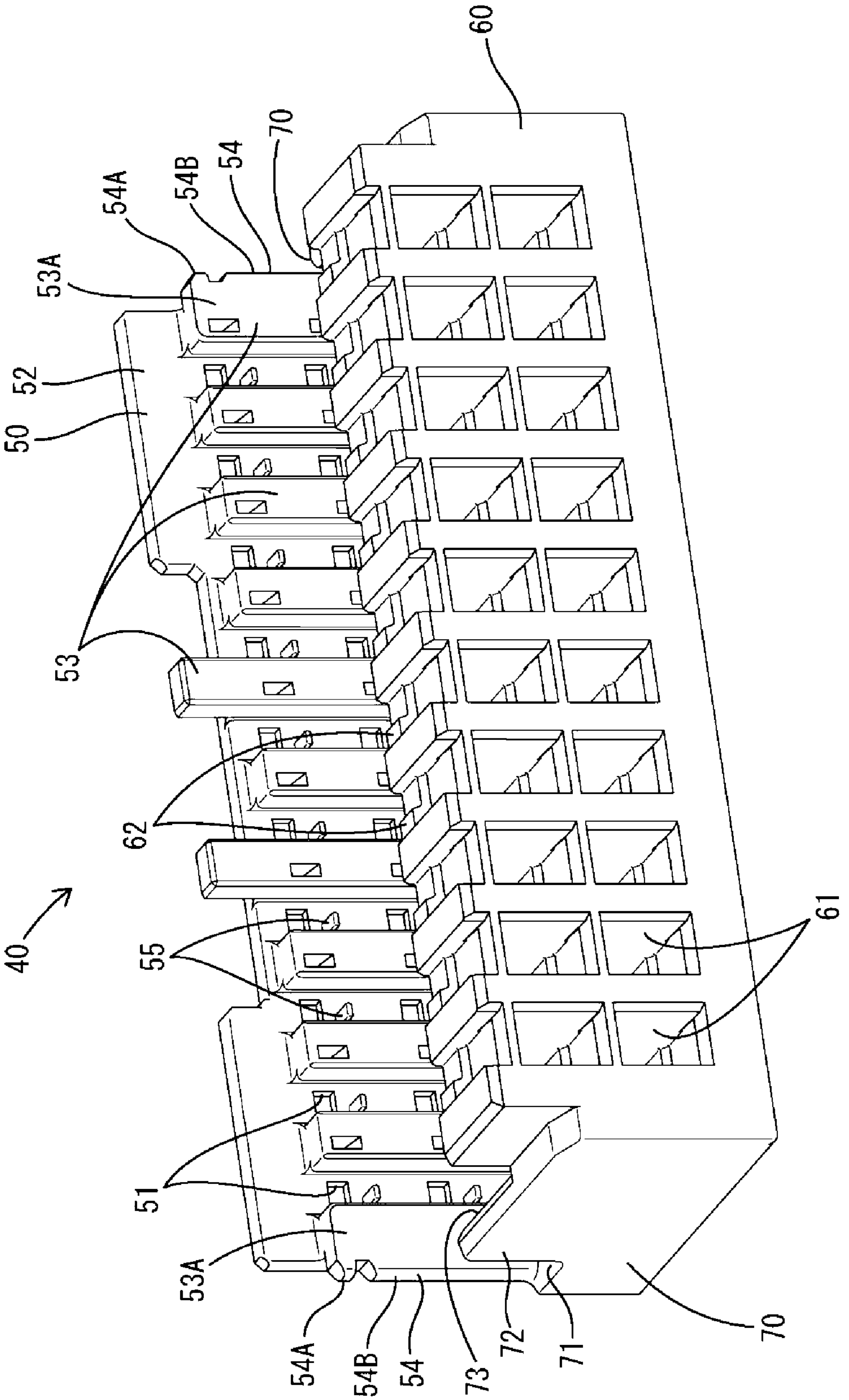
FIG. 3 is a perspective view of a retainer viewed from behind.

The retainer 40 is made of synthetic resin. The retainer 40 is movable in the vertical direction between a temporary locking position (see FIG. 4) and a complete locking position (see FIG. 5) with respect to the housing 20. As shown in FIGS. 2 and 3, the retainer 40 includes a front portion 50, the retainer body portion 60 arranged behind the front portion 50 and a pair of side wall portions 70 located between the front portion 50 and the retainer body portion 60. The retainer body portion 60 is integrally coupled to the front portion 50 via the pair of side wall portions 70.

The front portion 50 is in the form of a rectangular plate. As shown in FIG. 1, the front portion 50 is mounted on a front surface side of the housing 20. As shown in FIGS. 2 and 3, the front portion 50 includes a plurality of through holes 51. The respective through holes 51 are arranged side by side in the lateral direction in three upper and lower stages. When the retainer 40 is at the complete locking position, the through holes 51 are located forward of the cavities 21 and communicate with the cavities 21. A front part of the through hole 51 is shaped to be expanded toward a front side and enables the mating terminal fitting to be guided into the cavity 21.

As shown in FIG. 3, the front portion 50 includes a front body portion 52 and a plurality of protrusions 53. The front body portion 52 is in the form of a rectangular plate. The plurality of protrusions 53 project rearward from the rear surface of the front body portion 52. The plurality of protrusions 53 are elongated in the vertical direction and arranged at intervals in the lateral direction. The front body portion 52 is provided with the through holes 51 between adjacent ones of the protrusions 53.

As shown in FIG. 3, a rib 54 projecting outward in the lateral direction (toward a side opposite to the other protrusion 53A) is provided on the protrusion 53 (referred to as the protrusion 53A) on each of both sides in the lateral direction. As shown in FIGS. 3 and 7, the rib 54 is provided with a first locking portion 54A and an edge portion 54B. The first locking portion 54A projects outward in the lateral direction (toward a side opposite to the other rib 54). The edge portion 54B is long in the vertical direction and provided below and away from the first locking portion 54A.

As shown in FIGS. 3 and 4, the front portion 50 includes a plurality of resilient portions 55. The resilient portion 55 is in the form of a rib projecting rearward from the rear surface of the front body portion 52. The resilient portion 55 is the form of a strip plate wide in the lateral direction. The resilient portion 55 projects within a formation range of the protrusion 53 in the front-rear direction. The respective resilient portions 55 are provided to correspond to the respective through holes 51 on the front body portion 52. The resilient portion 55 is provided at a position below the through hole 51 and on a right side between the adjacent protrusions 53.

Figure 5:
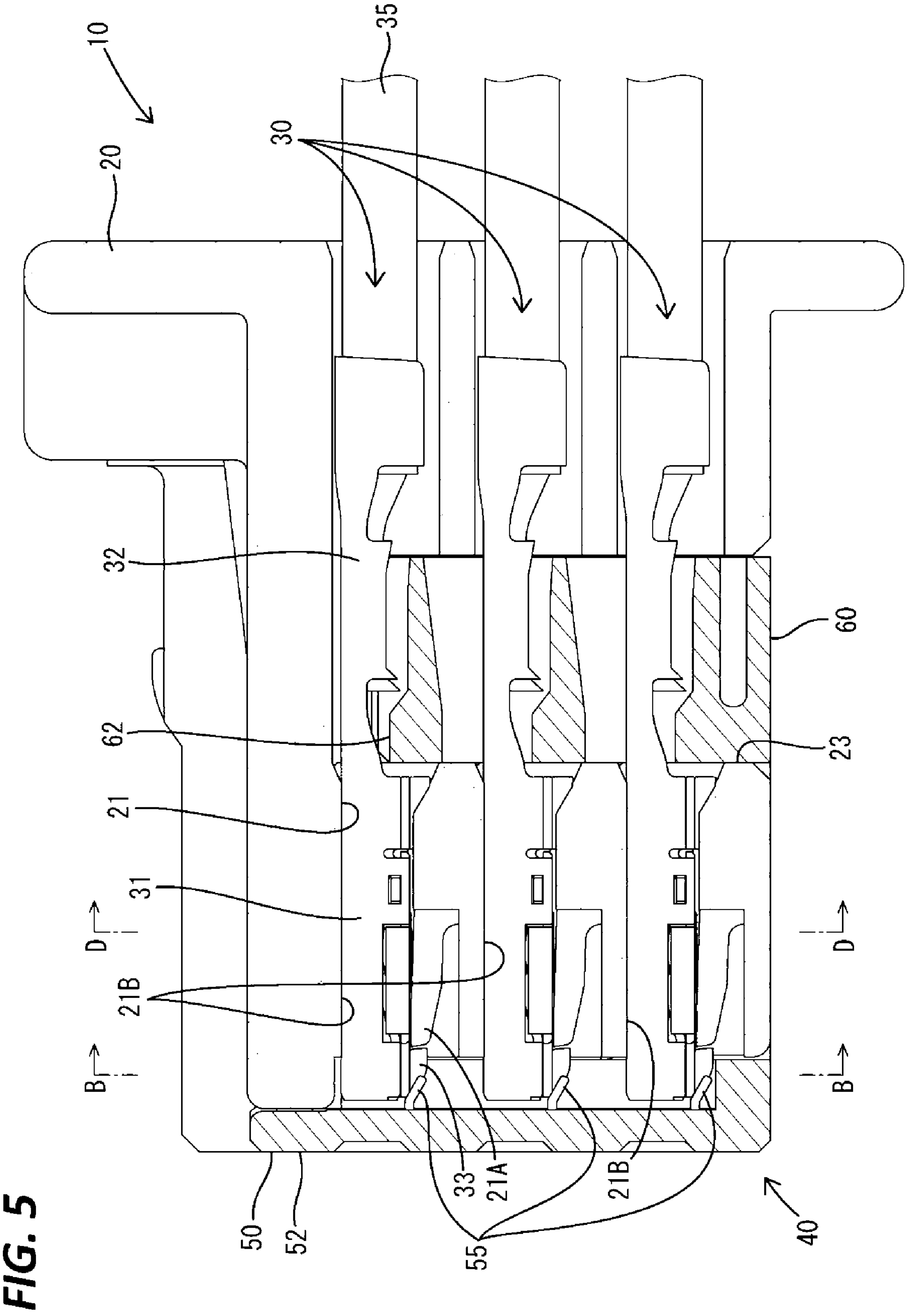
FIG. 5 is a side view in section of the connector when the retainer is at a complete locking position.

As shown in FIGS. 5 and 6, when the retainer 40 is at the complete locking position, the resilient portion 55 presses the terminal fitting 30 and sandwiches the terminal fitting 30 between a facing wall surface portion 21B of the cavity 21 and the resilient portion 55. The wall surface portion 21B constitutes an upper wall of the cavity 21. The box portion 31 of the terminal fitting 30 projects further forward than the wall surface portion 21B of the cavity 21. The resilient portion 55 is in contact with a chamfered portion 31B (part of the lower plate portion 31A to the right of the projecting portion 33) of the lower plate portion 31A of the box portion 31. The resilient portion 55 presses the chamfered portion 31B rearward and upward (toward the upper surface portion 21B). In this way, the resilient portion 55 can press the terminal fitting 30 against the wall surface portion 21B of the cavity 21 and can prevent an inclined posture (wrenched state) of the terminal fitting 30 at the time of connection to the mating terminal.

The retainer body portion 60 is arranged by being inserted into the mounting groove 23 of the housing 20. As shown in FIG. 3, the retainer body portion 60 includes a plurality of opening holes 61. The respective opening holes 61 are arranged side by side in the lateral direction in two upper and lower stages. The respective opening holes 61 communicate with the respective cavities 21 in two lower stages. Further, the retainer body portion 60 includes a plurality of escape restricting portions 62. The respective escape restricting portions 62 are provided to project at positions on the lower surfaces of the respective opening holes 61 and above the respective opening holes 61 on the upper surface of the retainer body portion 60. As shown in FIG. 5, the escape restricting portion 62 locks the rear end of the box portion 31 of the terminal fitting 30.

Figure 9:
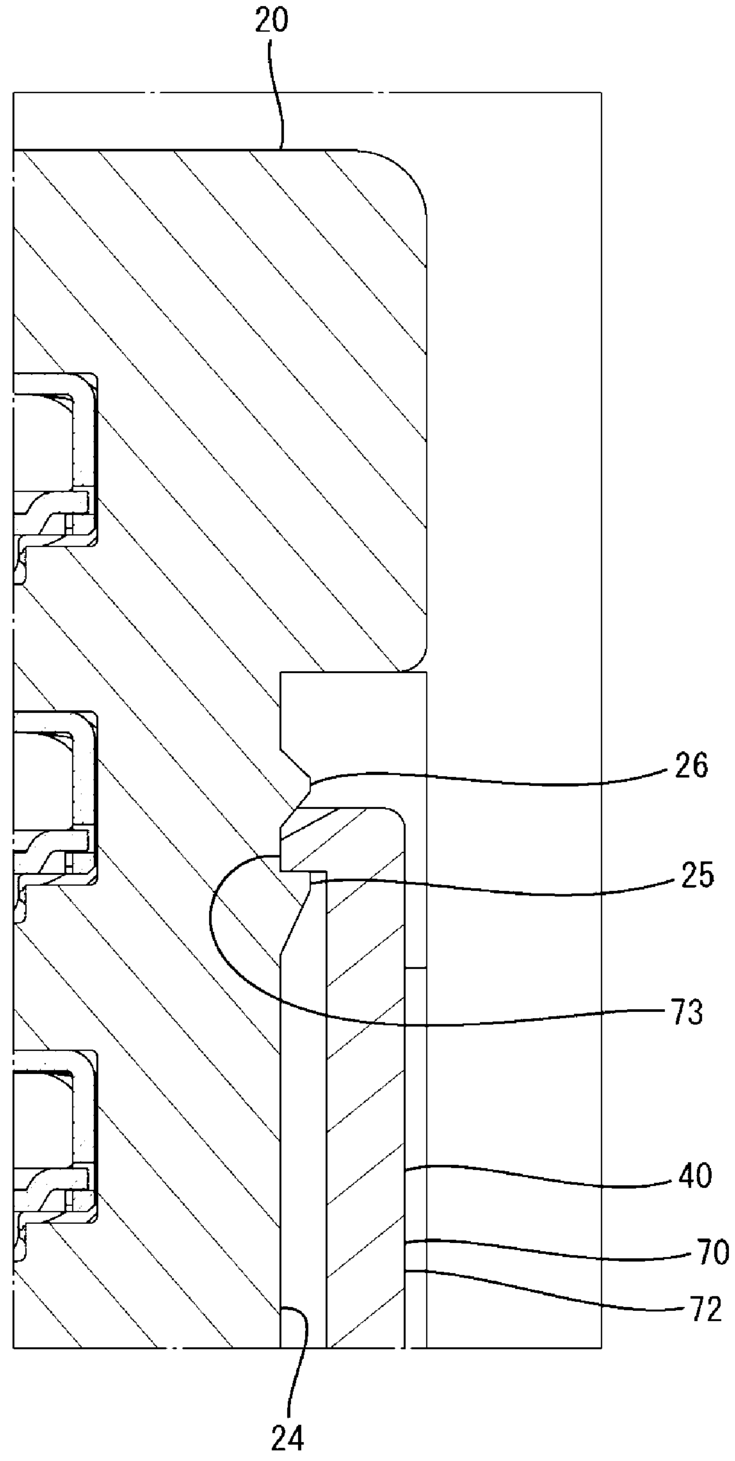
FIG. 9 is a section along C-C of FIG. 4.

A part of the side wall portion 70 connected to the front portion 50 is provided with a slit 71 recessed downward as shown in FIGS. 2 and 3. A part of the side wall portion 70 behind the slit 71 constitutes a side wall body portion 72. The side wall body portion 72 is resiliently deformable in the lateral direction. As shown in FIGS. 3 and 9, a second locking portion 73 is provided on the inner surface of the side wall body portion 72. The second locking portion 73 is in the form of a rib extending in the front-rear direction on the upper end of the inner surface of the side wall body portion 72.

(Functions of Connector)

The retainer 40 is mounted into the housing 20 from below. When the retainer 40 reaches the temporary locking position, the front portion 50 is arranged between the pair of side walls 27 as shown in FIG. 1. As shown in FIG. 7, the first locking portions 54A and the edge portions 54B of the ribs 54 are arranged below the third locked portions 29. By the contact of the first locking portions 54A with the third locked portions 29 from below, a movement of the retainer 40 from the temporary locking position to the complete locking position is restricted. As shown in FIG. 9, the second locking portions 73 are arranged between the first and second locked portions 25, 26. By the contact of the second locking portions 73 with the first locked portions 25 from above, the retainer 40 is restricted from escaping downward from the temporary locking position.

As shown in FIG. 4, the escape restricting portions 62 of the retainer body portion 60 are retracted to positions for allowing the insertion of the terminal fittings 30 into the cavities 21 at the temporary locking position. The terminal fitting 30 is inserted into the cavity 21 from behind while being connected to the end part of the wire 35. In the process of inserting the terminal fitting 30, the locking lance 21A contacts the box portion 31 to be resiliently deformed. When the terminal fitting 30 is properly inserted into the cavity 21, the locking lance 21A resiliently returns and locks the rear end of the box portion 31. In this way, the terminal fitting 30 is restricted from coming out rearward. The resilient portion 55 is separated downwardly of the terminal fitting 30.

Figure 8:
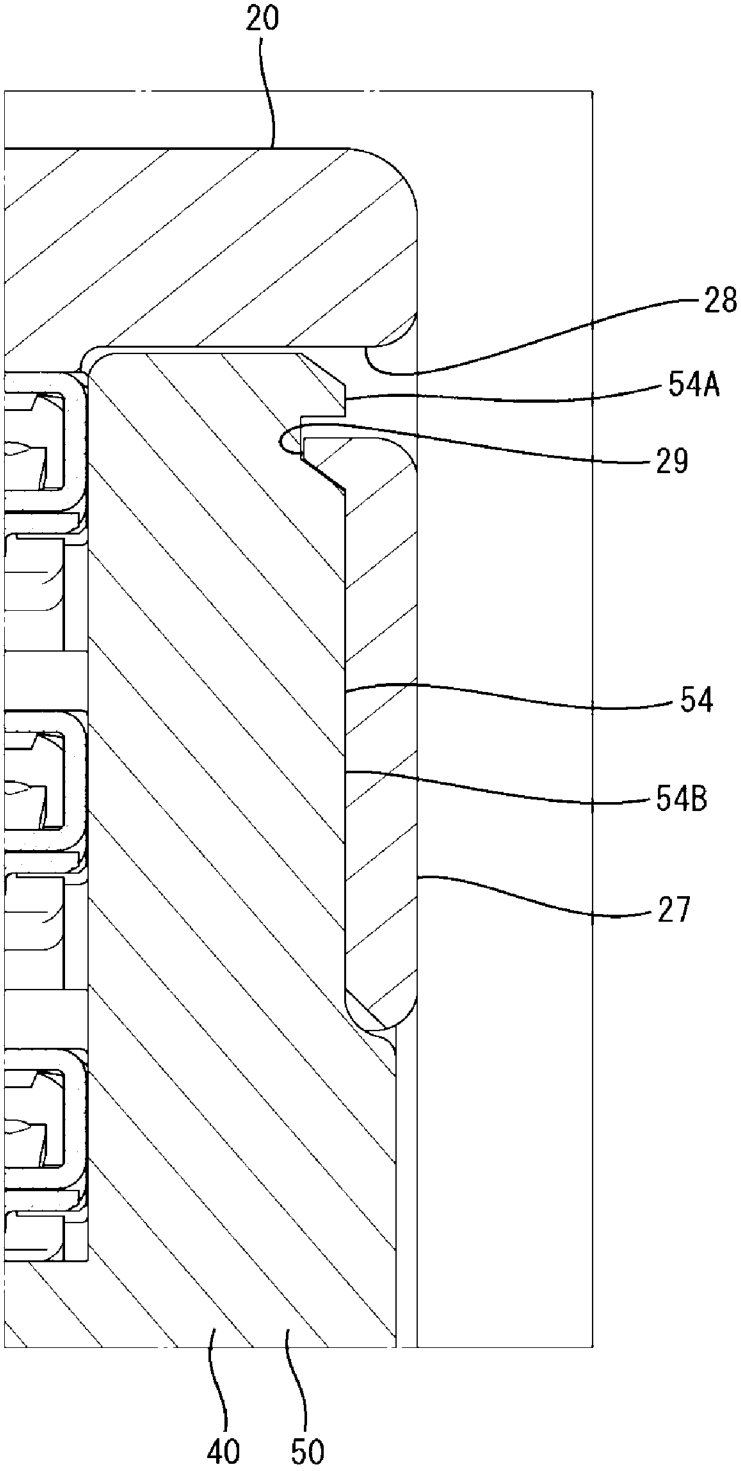
FIG. 8 is a section along B-B of FIG. 5.

Subsequently, the retainer 40 is pressed upward. If an upward pressing force is applied to the retainer 40, the first locking portions 54A of the ribs 54 press the third locked portions 29, whereby the side walls 27 are resiliently deformed outward in the lateral direction. The first locking portions 54A are released from a state locked to the third locked portions 29, and arranged above the third locked portions 29 as shown in FIG. 8 by the resilient return of the side walls 27. By the contact of the third locked portions 29 with the first locking portions 54A from below, a movement of the retainer 40 from the complete locking position to the temporary locking position is restricted.

Figure 10:
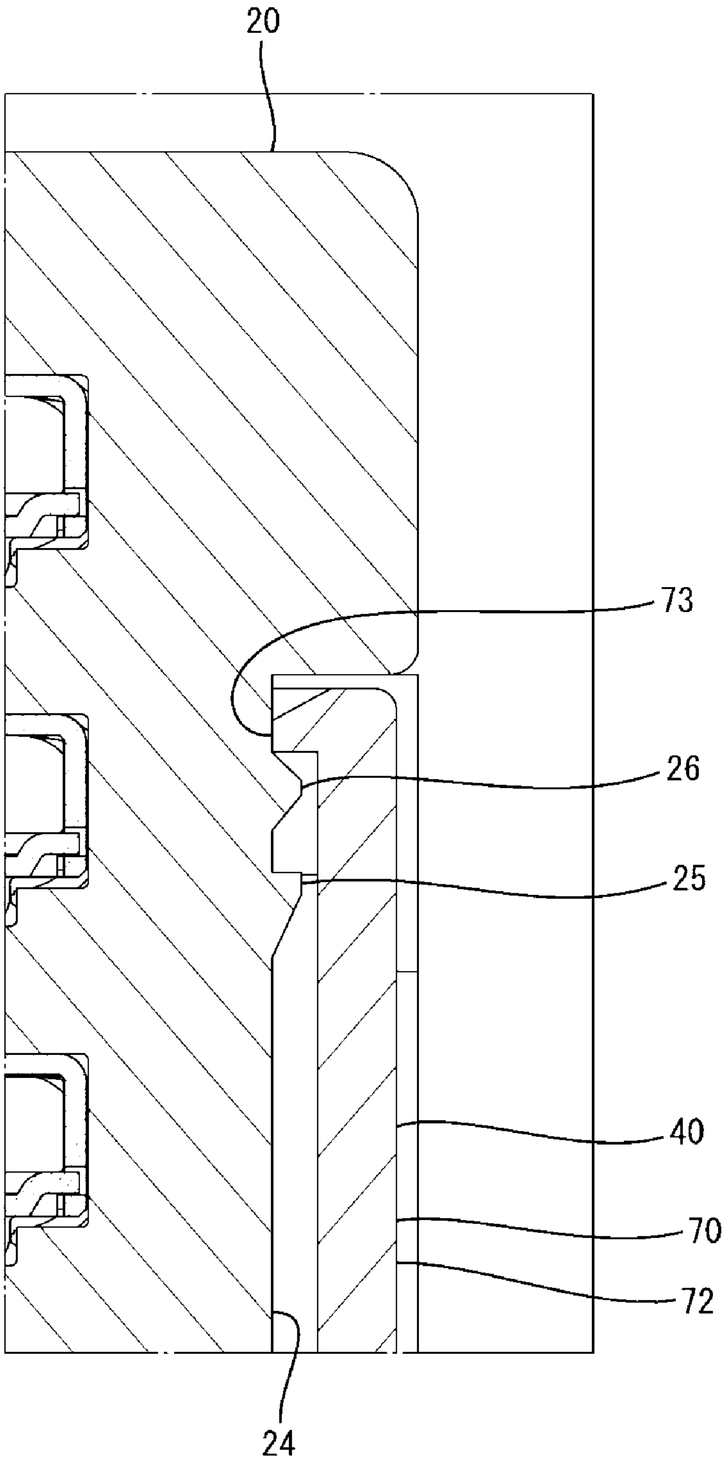
FIG. 10 is a section along D-D of FIG. 5.

Further, if the upward pressing force is applied to the retainer 40, the second locking portions 73 are pressed by the second locked portions 26, whereby the side wall body portions 72 are resiliently deformed outward in the lateral direction. The second locking portions 73 are released from a state locked to the second locked portions 26, and arranged above the second locked portions 26 as shown in FIG. 10 by the resilient return of the side wall body portions 72. By the contact of the second locked portions 26 with the second locking portions 73 from below, a movement of the retainer 40 from the complete locking position to the temporary locking position is restricted.

If the retainer 40 reaches the complete locking position, the escape restricting portions 62 are located behind the box portions 31 and lock the rear ends of the box portions 31 at the complete locking position as shown in FIG. 5. In this way, the terminal fittings 30 are secondarily restricted from coming out rearward.

As shown in FIG. 6, the resilient portion 55 presses the terminal fitting 30 and sandwiches the terminal fitting 30 between the facing wall surface portion 21B of the cavity 21 and the resilient portion 55. The resilient portion 55 presses the terminal fitting 30 in a moving direction (upward direction) of the front portion 50 from the temporary locking position to the complete locking position. Thus, the front portion 50 may be configured to press the resilient portions 55 against the terminal fittings 30 in the moving direction, i.e. configured such that the resilient portions 55 face the terminal fittings 30 in the moving direction, and a structure can be simplified.

As shown in FIG. 6, the resilient portion 55 is deflected and deformed downward by being pressed by the chamfered portion 31B. At this time, the upper surface of the resilient portion 55 is in surface contact with the chamfered portion 31B, and the resilient portion 55 is inclined downward toward the rear side. In this way, the resilient portion 55 is inclined to approach the locking lance 21A toward the rear side and contact the terminal fitting 30 in front of the locking lance 21A. Thus, the resilient portion 55 applies a pressing force including a component moving rearward (toward the locking lance 21A) to the terminal fitting 30. In this way, the terminal fitting 30 is sandwiched in the front-rear direction by the resilient portion 55 and the locking lance 21A, wherefore the rattling of the terminal fitting 30 in the front-rear direction can be restricted.

Effects of Embodiment

In the connector 10 of this embodiment, the front portion 50 includes the resilient portion 55 for pressing the terminal fitting 30 and sandwiching the terminal fitting 30 between the wall surface portion 21B of the facing cavity 21 and the resilient portion 55. In this way, the terminal fitting 30 can be pressed against the wall surface portion 21B of the cavity 21 by the resilient portion 55 and an inclined posture (wrenched state) of the terminal fitting 30 can be prevented at the time of connection to the mating terminal.

Further, the resilient portion 55 presses the terminal fitting 30 in the moving direction of the front portion 50 from the temporary locking position to the complete locking position. In this way, the front portion 50 may be configured to press the resilient portion 55 against the terminal fitting 30 in the moving direction, i.e. configured such that the resilient portion 55 faces the terminal fitting 30 in the moving direction, and the structure can be simplified.

Further, the retainer body portion 60 integrally coupled to the front portion 50 is formed behind the front portion 50. In this way, the number of components can be reduced as compared to the case where the front portion 50 and the retainer body portion 60 are separate bodies.

Further, the resilient portion 55 projects rearward from the front body portion 52 in front of the locking lance 21A, and is inclined to approach the locking lance 21A toward the rear side and contact the terminal fitting 30. In this way, the resilient portion 55 applies a pressing force including a component moving rearward (toward the locking lance 21A) to the terminal fitting 30. In this way, the terminal fitting 30 is sandwiched in the front-rear direction by the resilient portion 55 and the locking lance 21A, wherefore the rattling of the terminal fitting 30 in the front-rear direction can be restricted.

OTHER EMBODIMENTS

The present invention is not limited by the above described and illustrated embodiment, but is represented by claims. The present invention is intended to include all changes in the scope of claims and in the meaning and scope of equivalents and also include the following embodiments.

Although the cavities 21 are provided in three upper and lower stages in the above embodiment, the cavities 21 may be provided in one, two, four or more stages.

Although the front portion 50 and the retainer body portion 60 are integrally coupled in the above embodiment, the front portion 50 and the retainer body portion 60 may be configured as separate bodies and independently movable with respect to the housing 20.

Although the resilient portion 55 is in the form of a strip plate in the above embodiment, the resilient portion 55 may have another shape such as a cylindrical shape if being configured to be resiliently deformable.

Although the resilient portion 55 is configured to contact the chamfered portion 31B of the lower plate portion 31A of the terminal fitting 30 in the above embodiment, the resilient portion 55 may be configured to contact the lower plate portion 31A not provided with the chamfered portion 31B from below.

From the foregoing, it will be appreciated that various exemplary embodiments of the present disclosure have been described herein for purposes of illustration, and that various modifications may be made without departing from the scope and spirit of the present disclosure. Accordingly, the various exemplary embodiments disclosed herein are not intended to be limiting, with the true scope and spirit being indicated by the following claims.

What is claimed is:

1. A connector, comprising:
a housing;
a terminal fitting to be accommodated into a cavity of the housing; and
a front portion to be mounted on a front surface side of the housing, the front portion including a resilient portion for pressing the terminal fitting and sandwiching the terminal fitting between a facing wall surface portion of the cavity and the resilient portion, the resilient portion having a distal end formed opposite to an end that is fixed to the front portion,
wherein:
the resilient portion is configured to be resiliently deformed by the distal end being pressed against the terminal fitting,
a retainer body portion integrally coupled to the front portion is formed behind the front portion,
the housing includes a mounting groove, the retainer body portion being arranged in the mounting groove, and
the retainer body portion includes an escape restricting portion capable of locking the terminal fitting.

2. The connector of claim 1, wherein:
the front portion is movable between a temporary locking position and a complete locking position with respect to the housing, and
the resilient portion presses the terminal fitting in a moving direction of the front portion from the temporary locking position to the complete locking position.

3. The connector of claim 1, wherein:
the housing includes a locking lance for restricting the terminal fitting accommodated in the cavity from coming out rearward,
the front portion includes a front body portion, and
the resilient portion projects rearward from the front body portion in front of the locking lance and is inclined to approach the locking lance toward a rear side and contact the terminal fitting.

4. The connector of claim 1, wherein:
the terminal fitting includes a lower plate portion, and
the distal end of the resilient portion is further configured to contact the lower plate portion when the front portion moves with respect to the housing from a temporary locking position to a complete locking position.

5. The connector of claim 4, wherein:
the lower plate portion includes a chamfered portion inclined toward a rear side of the terminal fitting, and
the distal end of the resilient portion is further configured to be deflected by contacting the chamfered portion.

6. The connector of claim 4, wherein:
the lower plate portion includes a chamfered portion inclined toward a rear side of the terminal fitting, and
the distal end of the resilient portion is further configured to contact the chamfered portion when the front portion is in the complete locking position.

7. The connector of claim 1, wherein:

the front portion further includes a projection projecting rearward from a rear surface of a front body portion of the front portion and having a formation range in a front-rear direction of the housing, and the resilient portion is formed as a rib projecting rearward from the rear surface of the front body portion, the rib projecting within the formation range of the projection.

8. The connector of claim 7, wherein:

the projection of the front portion is formed as a plurality of projections, and the rib of the resilient portion is formed as a plurality of ribs, each rib of the plurality of ribs disposed between an adjacent pair of projections of the plurality of projections.

9. The connector of claim 1, wherein:

the resilient portion is formed as a rib having a strip plate shape, and the strip plate shape of the rib is formed to have a strip plate shape that is resiliently deformed when contacting a lower plate portion of the terminal fitting and is deflected downward away from the lower plate portion.

10. The connector of claim 1, wherein:

the resilient portion is formed as a rib having a cylindrical shape, and the cylindrical shape of the rib is resiliently deformed when contacting a lower plate portion of the terminal fitting and is deflected downward away from the lower plate portion.

* * * * *